UNITED STATES PATENT OFFICE.

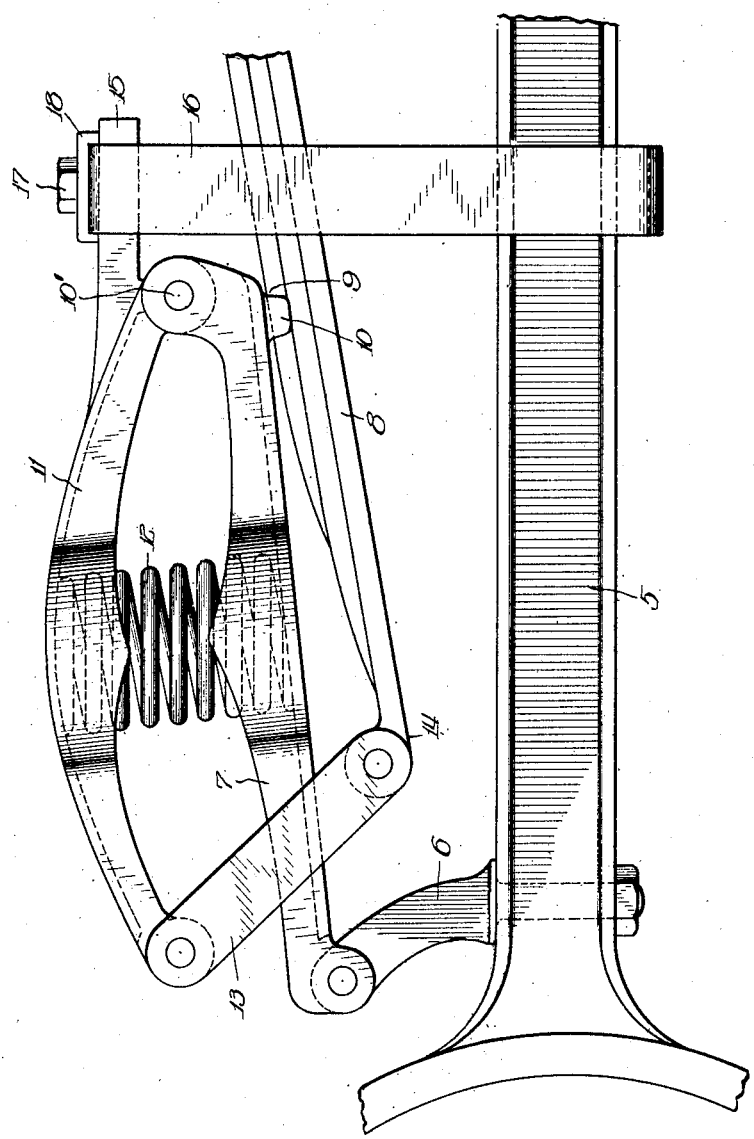

PETER PETRI, OF LACON, ILLINOIS.

SHOCK ABSORBER.

1,405,937.

Specification of Letters Patent.  Patented Feb. 7, 1922.

Application filed April 13, 1921. Serial No. 461,086.

*To all whom it may concern:*

Be it known that I, PETER PETRI, a citizen of the United States, residing at Lacon, in the county of Marshall and State of Illinois, have invented certain new and useful Improvements in Shock Absorbers, of which the following is a specification.

This invention relates to a new and improved shock absorber, and particularly to a device of this character adapted to be interposed between the usual vehicle spring and fixed shackle to which such springs are normally attached.

In connection with a number of light cars now in use, the usual spring equipment allows a large amount of side sway and free movement of the body, and while it is desirable to add additional shock absorbing means it is necessary that this means be so constructed as not to increase the side sway or rebound movement.

It is an object of the present invention to provide a shock absorber of this character which is simple in design and composed of relatively few parts, and which may be applied to existing vehicles without substantial change in their construction.

It is a further object to provide a device which is provided with means adapted to limit rebound.

It is an additional object to provide a device comprised of elements which may be manufactured at relatively low cost.

Other and further objects will appear as the description proceeds.

Broadly, my shock absorber comprises a lever pivoted to the usual fixed shackle, with its free end bearing on the spring, and a second lever pivotally connected to the free end of the fixed lever and extending above said first lever. The free end of the second lever is connected to the end of the vehicle motor spring and a spring is interposed between the two levers. Means are provided associated with the levers and with the vehicle axle adapted to limit rebound movement.

I have illustrated a preferred embodiment of my invention in the accompanying drawings, the single figure of which shows my shock absorber applied to vehicle elements of the type in use upon the Ford car.

The axle 5 has secured thereto the usual fixed shackle 6. Pivotedly secured to this shackle is the lever 7, the free end of which bears upon the spring 8 at the point 9. The lever 7 is provided with the downwardly extending lugs 10 which engage the sides of the spring to prevent the lever from slipping laterally therefrom. The second lever 11 is pivoted to the fixed lever at 10' and extends above that lever. The coil spring 12 is interposed between the central portions of the two levers. The free end of the second lever 11 is connected by the links 13 to the end 14 of the vehicle spring 8, two links 13 being provided, one passing upon either side of the lever 7. The lever 11 is provided with the inwardly extending lug 15 to which is secured the snubbing strap 16 by means of the bolt 17 and clamp 18. This strap extends downwardly in a loop about the axle 5, and as shown, its lower portion is normally spaced therefrom.

It will be observed that in assembling my shock absorber relative to the spring 8 and shackle 6, the latter is turned outwardly instead of inwardly to connect directly with the nut 14 of the spring, as is customary in the standard assembly of the car.

In the operation of my shock absorber, the end 9 of the lever 7 pivoting on the spring serves to give a reverse bend to the spring and thus somewhat stiffens the main spring. The action of the spring 8, however, is materially assisted by the spring 12, which serves to take up the small vibrations without transmitting them to the body of the vehicle. These small vibrations may be taken up entirely by the spring 12 and the most flexible portion of the spring 8, namely, that portion between the point 9 and the end 14.

This device does not add any side sway, but instead minimizes such movement, particularly in view of the fact that a longer spring base is given, since the shackle 6 is turned outwardly, as has been stated. The strap 16 is normally out of engagement with the axle and is adapted to engage that axle to prevent excessive rebound. Its action, since it is transmitted to the spring through the shock absorber, does not have the sudden jarring stop which is transmitted to the body by constructions in which the snubbing device is directly connected to the body.

While the device has been shown in connection with the parts of the standard Ford car, it is obviously applicable to other vehicle designs, and any necessary changes in construction may be made to adapt it to the particular design with which it is to be used, the present showing being illustrative only.

I claim:

1. A shock absorber adapted for use in association with a vehicle spring and fixed spring shackle, comprising a lever pivotedly associated with the shackle and bearing on said spring, a second lever pivotedly connected to the free end of the first lever, the second lever extending adjacent the first lever, a spring interposed therebetween, and means connecting the free end of the second lever to the vehicle spring.

2. A shock absorber adapted for use in association with a vehicle spring and fixed spring shackle, comprising a lever pivotedly associated with the shackle and bearing on said spring, a second lever pivotedly connected to the free end of the first lever, the second lever extending above the first lever, a compression spring interposed therebetween, and means connecting the free end of the second lever to the vehicle spring.

3. A shock absorber adapted for use in association with a vehicle spring and fixed spring shackle, comprising a lever pivotedly associated with the shackle and bearing on said spring, a second lever pivotedly connected to the free end of the first lever, the second lever extending adjacent the first lever, a spring interposed therebetween, and a pair of links extending on opposite sides of the first lever and connecting the second lever to the spring.

4. A shock absorber adapted for use in association with a vehicle spring and fixed spring shackle, comprising a lever pivotedly associated with the shackle and bearing on the vehicle spring adjacent the free end of the lever, the lever being provided with ears engaging the spring to prevent lateral displacement therefrom, a second lever pivotedly connected to the free end of the first lever, the second lever extending adjacent the first lever, a spring interposed therebetween, and a pair of links extending on opposite sides of the first lever and connecting the second lever to the spring.

5. A shock absorber adapted for use in association with a vehicle spring, vehicle axle and fixed spring shackle, comprising a lever pivotedly associated with the shackle and bearing on said spring, a second lever pivotedly connected to the free end of the first lever, a spring interposed between the two levers, means connecting the free end of the second lever to the vehicle spring, and a snubbing member associated with said levers and the vehicle axle to limit rebound.

6. A shock absorber adapted for use in association with a vehicle spring, vehicle axle and fixed spring shackle, comprising a lever pivotedly associated with the shackle and bearing on said spring, a second lever pivotedly connected to the free end of the first lever, a spring interposed between the two levers, means connecting the free end of the second lever to the vehicle spring, and a snubbing member attached to the second lever and adapted to engage the vehicle axle to limit rebound.

7. A shock absorber adapted for use in association with a vehicle spring, vehicle axle and fixed spring shackle, comprising a lever pivotedly associated with the shackle and bearing on said spring, a second lever pivotedly connected to the free end of the first lever, a spring interposed between the two levers, means connecting the free end of the second lever to the vehicle spring, and a snubbing member attached to a lug on the second lever extending inwardly beyond the junction of the two levers, said member encircling the vehicle axle and being normally out of engagement therewith.

Signed at Chicago, Illinois, this 11th day of April, 1921.

PETER PETRI